E. T. Covell.
Soldering Mach.

No. 3,740. Reissued Nov. 23, 1869.

Witnesses

H. H. Young

W. Burris

Inventor

E. T. Covell by David A. Burr

Atty

UNITED STATES PATENT OFFICE.

EDWARD T. COVELL, OF BROOKLYN, NEW YORK.

IMPROVEMENT IN SOLDERING-MACHINES.

Specification forming part of Letters Patent No. 63,220, dated March 26, 1867; Reissue No. 3,740, dated November 23, 1869.

*To all whom it may concern:*

Be it known that I, EDWARD T. COVELL, of Brooklyn, in the county of Kings and State of New York, have invented a new and Improved Soldering Apparatus; and I do hereby declare the following to be a full and exact description thereof, reference being had to the accompanying drawings, forming a part of this specification, in which—

Figure 1:
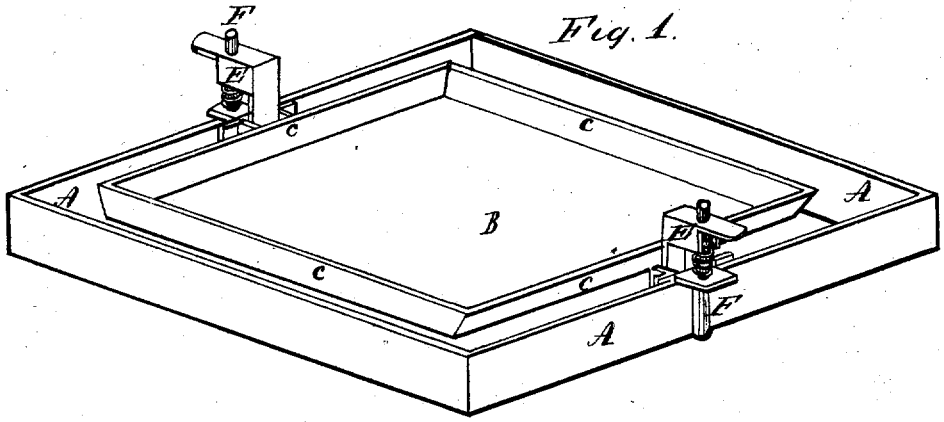
Figure 2:
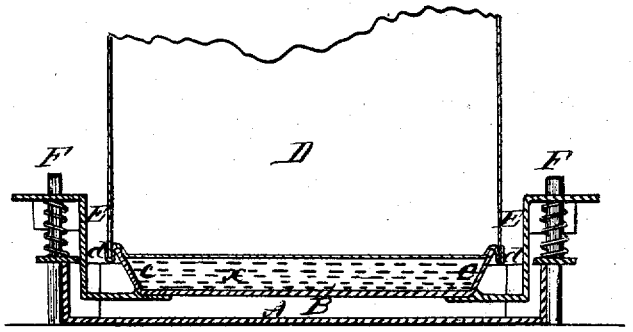

Figure 1 is a perspective view of my improved soldering apparatus; and Fig. 2, a central vertical section of the same, illustrating the position of a can on the supporting-plate.

The nature of my invention consists in the combination of an adjustable supporting and protecting plate with a suitable solder-pan for the purpose of dipping the projecting joint of a metallic vessel in the solder contained in the pan to such depth as may be required to perfect and close the same, and at the same time to protect the bottom of the can from contact with the solder or the effects of its heat, and in devices for facilitating the operation of said plate. The solder-pan may be a simple shallow metallic dish, A, of any desired form and dimensions, and is to be placed upon any suitable furnace. The supporting-plate B, which I combine with the pan A, is likewise metallic, although it may be of soapstone or of wood, protected from heat by a metallic lining or a suitable non-conducting composition. It may be a simple flat plate for cans whose joints project below the base; or its edges *c c* may be upturned for cans with joints, as illustrated in Fig. 2 of the drawings. In the latter case they pass into the groove, recess, or angle formed by the projecting joint *d* of the can D, the plate B being of such dimensions as that its edges shall fit closely into such groove or recess, as illustrated in Fig. 2. The edges *c c*, when upturned, as shown in the drawings, will serve also to inclose a composition, *x*, of plaster of paris or other good non-conductor of heat, which I contemplate using in combination therewith.

In order to secure the retention of the supporting-plate B in a determined position over the pan without restricting its vertical movements, it is provided with stay-bars E E, projecting therefrom, and whose ends are pierced with apertures to pass over upright guide-rods F F, secured on each side of the soldering-pan. Springs are also introduced to facilitate the elevation of the supporting-plate after its depression. These, for the sake of convenience and compactness, are made to encircle the upright guide-rods F F, so that the ends of the stay-bars E E may rest thereon, as illustrated in the drawings. By overcoming the resistance of the springs by means of pressure exerted through levers, or in any suitable manner, upon the plate B, it may be forced down into the solder to such depth as may be deemed necessary, the extent of motion being limited by means of suitable adjusting or set screws upon the guide-rods F F or bars E E.

With my improved apparatus, constructed substantially as described, I am enabled to solder the joints of vessels far more quickly, with much less solder, more efficiently, and at less expense than by the usual methods. In using it I place the soldering-pan A, filled with an alloy containing a much larger quantity of lead than is admissible in solder to be applied with a soldering-iron, upon any suitable furnace. I then place the supporting-plate B in its proper position over the soldering-pan A, as seen in Fig. 2 of the drawings, so that its bottom rests upon the molten solder, leaving only that portion of the solder exposed which flows around the upturned edges *c c* of the plate and the sides of the pan. The can to be soldered having projecting joints, as illustrated in Fig. 2, being now placed upon the supporting-plate B, so that the joints *d d* shall project over the edges *c c* thereof, the plate is forced down by means of a lever or treadle or other equivalent device, or by means of pressure upon the can, until the joints *d d* are immersed in the molten solder rising around the same, when it is then at once released and quickly elevated to its first position by the action of the springs or their equivalents. The can thus soldered is removed to make place for another. As the outer edge of the hook-shaped flange *d*, forming the joint of the cans to be soldered, is not turned up quite so high as the interior bend forming the groove or channel along the joint, the joint may be dipped in the solder far enough to cover this edge and completely fill and close the joint without danger of its flowing through into the can, or over the edge of the supporting-plate to the bottom of the can. The bottom of the can is completely protected from the heat of the solder in the process by the interposed layer *x* of plaster or its equivalent.

Different sizes and forms of supporting-plates B may be used to fit various sizes of cans and different shapes thereof, whether round or square, and several such sizes and forms of supporting-plates may be used with the same solder-pan by a proper arrangement and adjustment of the stay-bars E E in relation to the solder-pan and its guide-rods F F.

Although I prefer to make the supporting-plate B of my soldering apparatus movable and adjustable, as described, still I contemplate its combination with the solder-pan A in a fixed position at such a height above the bottom of the pan as that, when the pan is properly filled with solder, the edges and joints of a can placed on the plate B and projecting over it shall be sufficiently immersed in the solder to become filled and closed thereby. In this form of my apparatus the solder is always protected (except in the narrow channel around the plate B) from the atmosphere.

Having thus fully described my invention, I claim therein as new and desire to secure by Letters Patent—

1. A movable adjustable support so constructed and combined with a receptacle for molten solder as to properly sustain the vessel to be soldered and allow its joints or seams to be dipped in the solder and removed therefrom, substantially as herein set forth.

2. The supporting-plate B, when secured in a fixed position, and so combined with a pan or vessel, A, to contain molten solder, as that the plate B shall extend over and partially cover the solder-space in the pan, substantially as herein set forth.

3. The combination of a suitable non-conducting material, *x*, with the supporting-plate or base-piece B of a soldering apparatus constructed and arranged substantially as herein set forth.

4. The stay bars or arms E E, in combination with a movable support, B, solder-pan A, and fixed supports F, to guide and retain the support in a proper position over or within the solder-pan A, substantially as herein set forth.

5. In combination with the movable support B, guides F F, and a solder-pan, A, springs so placed and arranged as to facilitate the elevation of the support after its depression, substantially as herein set forth.

E. T. COVELL.

In presence of—
THEO. F. JACKSON,
J. H. DOLMAP.